(12) United States Patent
Castro et al.

(10) Patent No.: US 8,945,494 B1
(45) Date of Patent: Feb. 3, 2015

(54) SYNTHESIS OF CALCIUM SULFIDE (CAS) NANOPARTICLES

(71) Applicants: Miguel E. Castro, Mayaguez, PR (US); Daniel Rivera, Mayaguez, PR (US)

(72) Inventors: Miguel E. Castro, Mayaguez, PR (US); Daniel Rivera, Mayaguez, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 13/902,274

(22) Filed: May 24, 2013

(51) Int. Cl.
*C01F 11/00* (2006.01)
*C09K 11/56* (2006.01)

(52) U.S. Cl.
CPC ............ *C09K 11/567* (2013.01); *Y10S 977/773* (2013.01); *Y10S 977/81* (2013.01); *Y10S 977/904* (2013.01); *Y10S 977/927* (2013.01)

USPC ........ 423/155; 423/561.1; 977/773; 977/810; 977/904; 977/927

(58) Field of Classification Search
USPC ............... 423/155, 555, 561.1; 977/773, 810, 977/904, 927
See application file for complete search history.

(56) References Cited

U.S. PATENT DOCUMENTS

| 4,374,037 | A | * | 2/1983 | Takahashi | ............... 252/301.4 S |
| 5,879,830 | A | * | 3/1999 | Olper et al. | ..................... 429/49 |
| 7,288,239 | B2 | * | 10/2007 | Ibarra et al. | .................. 423/554 |

* cited by examiner

*Primary Examiner* — Timothy Vanoy
(74) *Attorney, Agent, or Firm* — Hoglund & Pamias, P.S.C.; Roberto J. Rios

(57) ABSTRACT

The invention provides a simple an efficient method for the synthesis of CaS nanoparticles, where a solution of CaAc in DMSO is warmed in a microwave oven.

6 Claims, 2 Drawing Sheets
(1 of 2 Drawing Sheet(s) Filed in Color)

SYNTHESIS OF CALCIUM SULFIDE (CAS) NANOPARTICLES

GOVERNMENT INTEREST

The claimed invention was made with U.S. Government support under grant number R25GM099023 awarded by the National Institutes of Health (NIH). The government has certain rights in this invention.

BACKGROUND OF THE INVENTION

There are numerous biomedical applications of fluorescent nanoparticles scattered in the literature. The use of nanostructures in a variety of medical, clinical and biomedical applications is limited by their biocompatibility. Indeed, scientists and engineers have spent considerable amount of time and effort in the development of biocompatible nanostructures.

SUMMARY OF THE INVENTION

The present invention discloses a method for preparing CaS nanoparticles with the hope to develop a platform of florescent biocompatible nanostructures. Calcium and sulfur are two elements that are widely present in the human body and CaS nanoparticles are expected to be biocompatible and easy to use in clinical laboratory measurements.

According to an aspect of the invention, a method for synthesizing Calcium Sulfide (CaS) nanoclusters is achieved by preparing a solution of calcium acetate in DMSO.

According to another aspect of the invention, the solution is heated intermittently for a predetermined amount of time.

According to still another aspect of the invention, the solution is heated in a microwave oven.

According to one aspect of the invention, the microwave oven is operated at 100 watts and 2.45 GHz.

According to one aspect of the invention, the solution is heated in cycles of 5-seconds "on" and 15-seconds "off".

According to another aspect of the invention, the solution is heated for a total of 75 seconds of microwave radiation.

According to still another aspect of the invention, the solution is heated up to 15 cycles.

BRIEF DESCRIPTION OF THE DRAWINGS

The patent or application file contains at least one figure executed as a color photograph. Copies of this patent or patent application publication with color photograph(s) will be provided by the Office upon request and payment of the necessary fee.

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Experimental Procedure

Calcium sulfide (CaS) nanostructures were obtained from the reaction of calcium acetate with sulfide ions generated from the controlled decomposition of dimethylsulfoxide (DMSO) in a Daewoo KOR-1NOA microwave oven operated at 1000 watts and 2.45 GHz with a capacity of 1.1 cubic feet. Other microwave ovens models were used obtaining the same results. The optical properties of the calcium sulfide formed were compared to a control sample of calcium sulfide prepared from a standard double exchange reaction between sodium sulfide and calcium acetate.

Figure 1:
FIG. 1 shows samples prepared using microwave-assisted synthesis of CaS nanoclusters in DMSO, according to the present invention.
Figure 2:
FIG. 2 shows a sample of DMSO mixed with calcium acetate without microwave exposure, according to the present invention.
Figure 3:
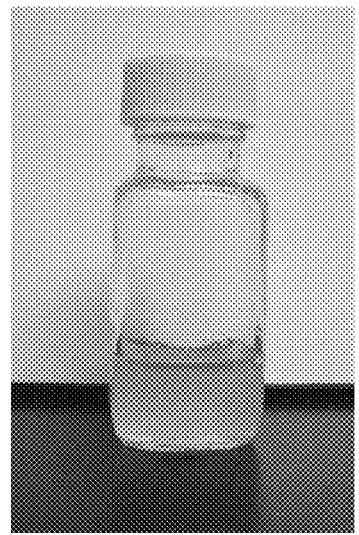
FIG. 3 shows a sample of Calcium acetate and sodium sulfide dissolved in DMSO, according to the present invention.
Figure 4:
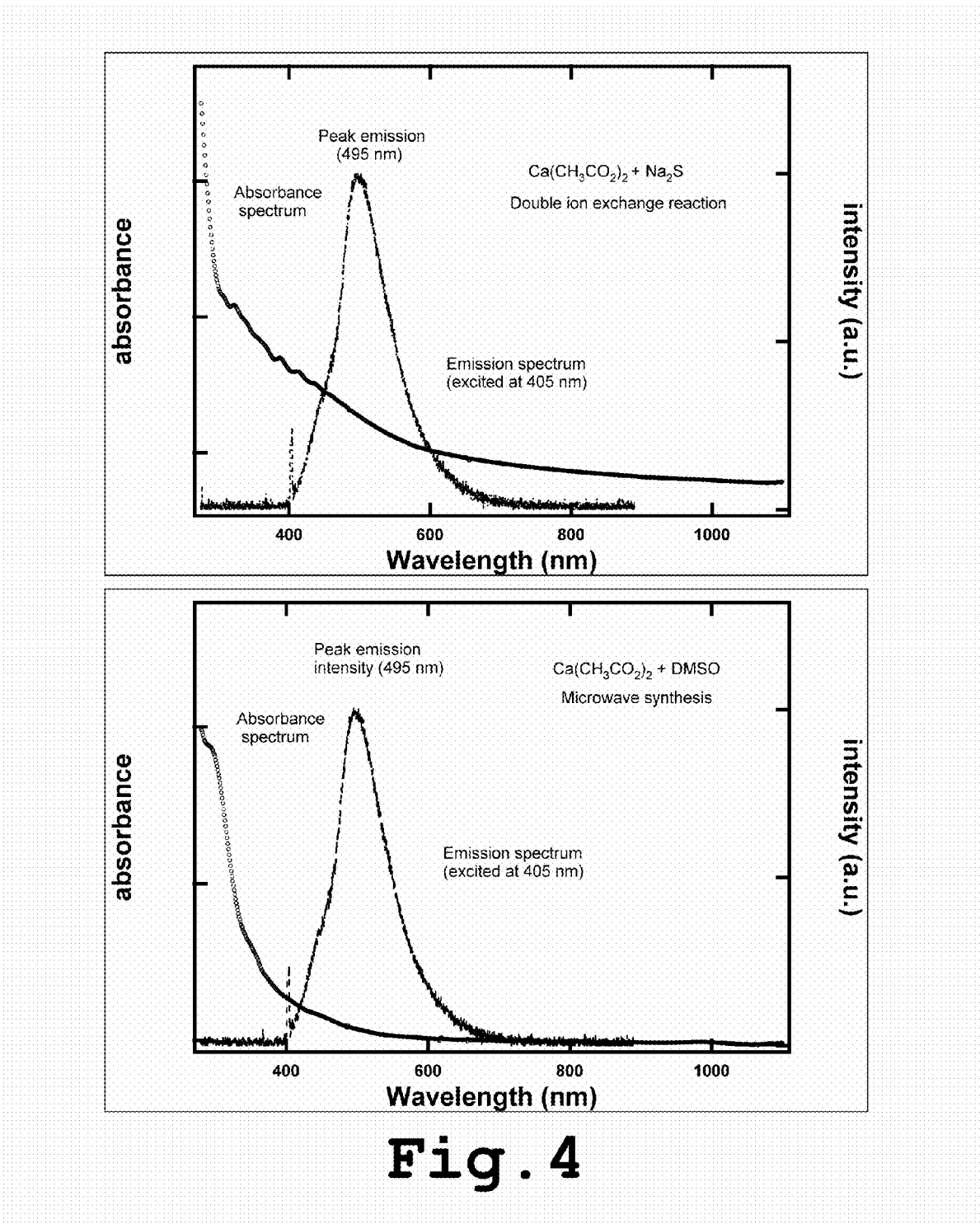
FIG. 4 shows absorbance and emission spectra of CaS samples prepared by prior art and the method according to the present invention.

Calcium sulfide (Fisher Scientific, CAS no. 20548-54-3) was purchased and used without further purification. Solutions containing 5.045 mg (FIG. 1, sample a) or 14.993 mg (FIG. 1, sample b) of calcium acetate in 10.00 mL DMSO were prepared and used as master solutions. Each solution was heated in cycles of 5-seconds "on" and 15-seconds "off" in the microwave oven. This process was repeated for up to intervals, for a total of 75 seconds of exposure to microwave radiation to the sample as shown in FIG. 1. Another solution that served as our blank contained 6.018 mg calcium acetate, but was not exposed to microwaves as shown in FIG. 2. The optical properties of the calcium sulfide formed were compared to a control sample of calcium sulfide prepared from a standard double exchange reaction between 16.924 mg of sodium sulfide and 9.457 mg of calcium acetate in 10 mL of DMSO as shown in FIG. 3. The CaS absorbs strongly in the UV with a long wavelength tail that extends to the visible. FIG. 4 shows absorbance and emission ($\lambda_{exc}$=405 nm) spectra of CaS samples prepared by mixture of $Ca(CH_3CO_2)_2$ and $Na_2S$ in DMSO and for the $Ca(CH_3CO_2)_2$ microwave-assisted reaction. It is important to note that the source of sulfur ions in the microwave-assisted reaction is also the solvent. Theoretical calculations are consistent with strong electronic transitions in the UV and visible in small CaS cluster while larger clusters also absorb in the near IR—the later expected in bulk CaS samples—but not observed here in the nanoclusters. The net reaction for the formation of CaS nanostructures using microwave irradiation:

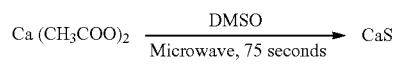

$$Ca(CH_3COO)_2 \xrightarrow[\text{Microwave, 75 seconds}]{\text{DMSO}} CaS$$

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:

1. A method for synthesizing Calcium Sulfide (CaS) nanoclusters comprising:
   preparing a solution of calcium acetate in DMSO; and
   heating said solution intermittently for a predetermined amount of time.

2. The method of claim 1, wherein said solution is heated in a microwave oven.

3. The method of claim 2, wherein said microwave oven is operated at 100 watts and 2.45 GHz.

4. The method of claim 2, wherein said solution is heated in cycles of 5-seconds "on" and 15-seconds "off".

5. The method of claim 4, wherein said solution is heated for a total of 75 seconds of microwave radiation.

6. The method of claim 4, wherein said solution is heated up to 15 cycles.

\* \* \* \* \*